(12) United States Patent
Cabral et al.

(10) Patent No.: US 8,004,523 B1
(45) Date of Patent: Aug. 23, 2011

(54) TRANSLATION OF REGISTER-COMBINER STATE INTO SHADER MICROCODE

(75) Inventors: Brian Cabral, San Jose, CA (US); Amy J. Migdal, Cupertino, CA (US); Rui M. Bastos, Porto Alegre (BR); Karim M. Abdalla, Menlo Park, CA (US)

(73) Assignee: NVIDIA Corporation, Santa Clara, CA (US)

( * ) Notice: Subject to any disclaimer, the term of this patent is extended or adjusted under 35 U.S.C. 154(b) by 36 days.

(21) Appl. No.: 11/966,905

(22) Filed: Dec. 28, 2007

Related U.S. Application Data

(63) Continuation of application No. 10/899,603, filed on Jul. 27, 2004, now Pat. No. 7,324,106.

(51) Int. Cl.
*G06T 15/50* (2006.01)
*G06F 12/02* (2006.01)
*G06F 9/44* (2006.01)
*G09G 5/36* (2006.01)

(52) U.S. Cl. ......... 345/426; 345/543; 345/559; 719/328

(58) Field of Classification Search ................. 345/426, 345/543, 559; 719/328
See application file for complete search history.

(56) References Cited

U.S. PATENT DOCUMENTS

| | | | | | |
|---|---|---|---|---|---|
| 4,992,938 | A | * | 2/1991 | Cocke et al. | 712/217 |
| 5,367,684 | A | * | 11/1994 | Smith | 717/140 |
| 5,564,031 | A | * | 10/1996 | Amerson et al. | 711/209 |
| 5,914,730 | A | * | 6/1999 | Santos et al. | 345/531 |
| 5,933,158 | A | * | 8/1999 | Santos et al. | 345/568 |
| 5,936,640 | A | * | 8/1999 | Horan et al. | 345/531 |
| 5,990,914 | A | * | 11/1999 | Horan et al. | 345/531 |
| 6,069,638 | A | * | 5/2000 | Porterfield | 345/568 |
| 6,192,457 | B1 | * | 2/2001 | Porterfield | 711/206 |
| 6,286,027 | B1 | * | 9/2001 | Dwyer et al. | 718/107 |
| 6,333,744 | B1 | * | 12/2001 | Kirk et al. | 345/506 |
| 6,389,485 | B1 | * | 5/2002 | Chelstowski et al. | 719/328 |
| 6,408,433 | B1 | * | 6/2002 | Click et al. | 717/154 |
| 6,424,348 | B2 | * | 7/2002 | Parikh et al. | 345/522 |
| 6,438,557 | B1 | * | 8/2002 | Dent | 707/102 |
| 6,452,600 | B1 | * | 9/2002 | Parikh et al. | 345/522 |
| 6,456,290 | B2 | * | 9/2002 | Parikh et al. | 345/522 |
| 6,724,394 | B1 | * | 4/2004 | Zatz et al. | 345/581 |

(Continued)

FOREIGN PATENT DOCUMENTS

EP 1182618 A2 * 2/2002

OTHER PUBLICATIONS

IBM Technical Disclosure Bulletin No. NN85112526, "Validity and Preserving Registers", Nov. 1, 1985, vol. 28, Issue 6, 5 pages, hereinafter IBM TDB.*

(Continued)

*Primary Examiner* — Ulka Chauhan
*Assistant Examiner* — Roberta Prendergast
(74) *Attorney, Agent, or Firm* — Patterson & Sheridan, LLP.

(57) ABSTRACT

An apparatus and method for translating fixed function state into a shader program. Fixed function state is received and stored and when a new shader program is detected the fixed function state is translated into shader program instructions. Registers specified by the program instructions are allocated for processing in the shader program. The registers may be remapped for more efficient use of the register storage space.

19 Claims, 11 Drawing Sheets

U.S. PATENT DOCUMENTS

| | | | | |
|---|---|---|---|---|
| 6,741,254 B1* | 5/2004 | Jeddeloh | ............ | 345/532 |
| 6,819,325 B2* | 11/2004 | Boyd et al. | ............ | 345/559 |
| 6,862,730 B1* | 3/2005 | Gorti et al. | ............ | 717/159 |
| 6,919,901 B2* | 7/2005 | Detrick | ............ | 345/559 |
| 6,963,345 B2* | 11/2005 | Boyd et al. | ............ | 345/559 |
| 7,009,605 B2* | 3/2006 | Dietrich et al. | ............ | 345/419 |
| 7,015,909 B1* | 3/2006 | Morgan, III et al. | ............ | 345/426 |
| 7,034,828 B1* | 4/2006 | Drebin et al. | ............ | 345/426 |
| 2004/0061700 A1* | 4/2004 | Shioya | ............ | 345/426 |
| 2004/0243908 A1* | 12/2004 | Box et al. | ............ | 714/759 |
| 2005/0086317 A1* | 4/2005 | Boyd et al. | ............ | 709/208 |
| 2005/0086669 A1* | 4/2005 | Boyd et al. | ............ | 719/328 |
| 2006/0012604 A1* | 1/2006 | Seetharamaiah et al. | ..... | 345/582 |

OTHER PUBLICATIONS

Bhanirantka, P.; Demange, Y., "OpenGL volumizer: a toolkit for high quality volume rendering of large data sets", Proc. IEEE/ACM SIGGRAPH Symposium on Volume Visualization and Graphics, Oct. 28-29, 2002, pp. 45-53.*

Purcell, T. J., Buck, I., Mark, W. R., and Hanrahan, P. 2002. Ray tracing on programmable graphics hardware. In Proceedings of the 29th Annual Conference on Computer Graphics and interactive Techniques (San Antonio, Texas, Jul. 23-26, 2002). SIGGRAPH '02. ACM, New York, NY, 703-712.*

Joao Comba and Rui Bastos, "Special effects with current graphics hardware", Revista de Informatica Teorica e Aplicada, RITA, vol. VIII, No. 2, pp. 1-20, Oct. 2001.*

Proudfoot, K., Mark, W. R., Tzvetkov, S., and Hanrahan, P., Aug. 2001, "A real-time procedural shading system for programmable graphics hardware", Proceedings of the 28th Annual Conference on Computer Graphics and interactive Techniques, SIGGRAPH '01, ACM, New York, NY, pp. 159-170.*

Eggers, et al. "Simultaneous Multithreading: A Platform for Next-Generation Processors," IEEE Micro, vol. 17, No. 5, pp. 12-19, Sep./Oct. 1997.

* cited by examiner

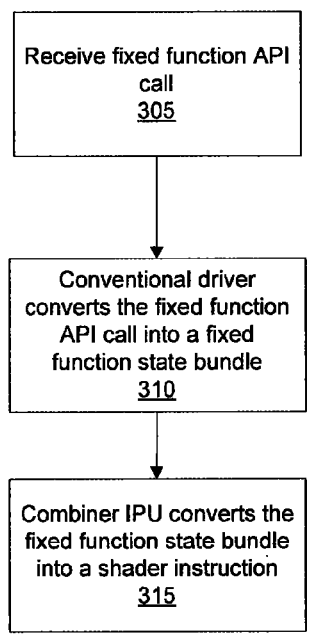
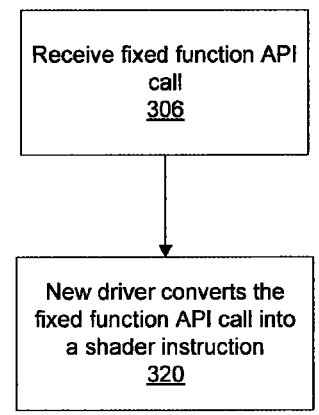
Fig. 3A
Fig. 3B

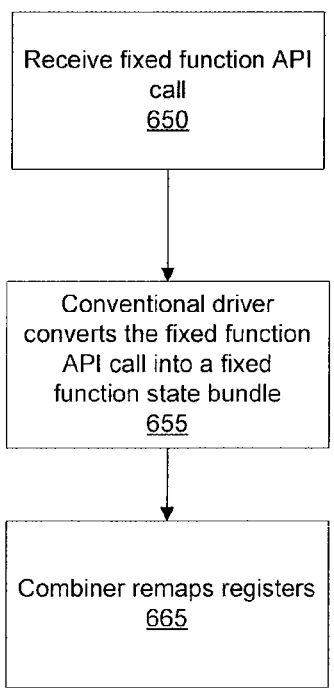
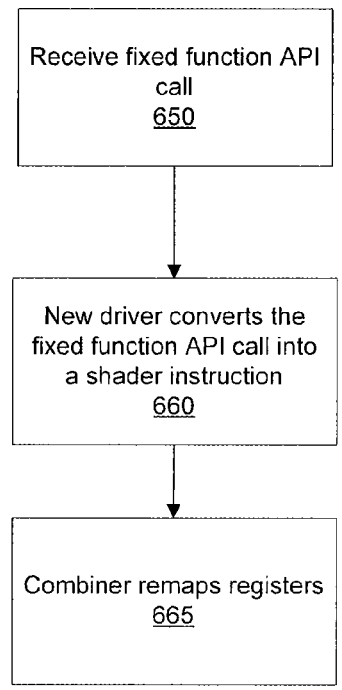
Fig. 6C
Fig. 6D

TRANSLATION OF REGISTER-COMBINER STATE INTO SHADER MICROCODE

CROSS-REFERENCE TO RELATED APPLICATIONS

This application is a continuation of U.S. patent application Ser. No. 10/899,603, filed Jul. 27, 2004 now U.S. Pat. No. 7,324,106 which is herein incorporated by reference.

FIELD OF THE INVENTION

One or more aspects of the invention generally relate to graphics data processing, and more particularly to performing combiner operations in a programmable graphics processor.

DESCRIPTION OF THE RELATED ART

Current graphics data processing includes systems and methods developed to perform a specific operation on graphics data, e.g., linear interpolation, tessellation, rasterization, texture mapping, depth testing, etc. More recently, portions of graphics processors are programmable, supporting a wider variety of operations for processing vertex data and fragment data. However, these graphics processors also include fixed function computation units to perform specific operations, particularly for performing texture mapping operations, such as level of detail (LOD) computations, texture blending, and filtering. The fixed function computation units for performing texture blending are configured in a pipeline, such as a prior art Texture Blend Unit 100 shown in FIG. 1, configured using fixed function state.

Each Combiner Unit 140 within Texture Blend Unit 100 may be configured to perform a limited set of texture blending operations using inputs read from registers. The fixed function state specifies which register value should be multiplexed to which multiplier or adder input. A Specular Combiner Unit 150 is configured to blend specular color data with blended texture and color data. A Final Combiner Unit 160 is configured to blend fog data with blended specular, color, and texture data and produce shaded fragment data.

As greater portions of graphics processors are programmable, it is desirable to perform texture blending using one or more programmable computation units and remove the fixed function units to save die area and improve efficiency. However, in order to execute code written for a processor supporting fixed function units, the fixed function state must be converted into program instructions for execution by the one or more programmable computation units.

Accordingly, it is desirable to have a graphics processor that can execute code written for a processor supporting fixed function unit and a program written for programmable computation units without requiring either a driver upgrade or inclusion of the fixed function units within the graphics processor.

SUMMARY OF THE INVENTION

The current invention involves new systems and methods for translating fixed function state into shader programs. An applications programming interface (API) call for a fixed function unit is converted into shader program instruction. A conventional driver designed to support fixed function state may convert API calls into fixed function state and an apparatus within a graphics processor may translate the fixed function state into a shader program. The apparatus enables the conventional driver to function with a graphics processor which does not include a fixed function unit for performing combiner operations. Alternatively, another driver may convert the API calls directly into a shader program. The apparatus may be used to improve performance of the other driver by offloading the translation function for some API calls from the other driver. In either case, when the apparatus generates a shader program the apparatus will allocate registers for processing the shader program. The apparatus may also remap the registers to more efficiently pack the registers.

Various embodiments of the invention include an apparatus for generating a shader program based on a set of fixed function state. The apparatus includes a storage unit and an instruction emulator. The storage unit is configured to receive and store the set of fixed function state. The instruction emulator is configured to generate the shader program by translating the set of fixed function state into the shader program.

Various embodiments of a method of the invention for generating shader program instructions include receiving a fixed function application programming interface call, converting the fixed function application programming interface call into a fixed function state bundle, and translating the fixed function state bundle into at least one shader program instruction.

Various embodiments of a method of the invention for translating fixed function state into a shader program includes receiving a packet, determining whether or not the packet indicates a new fixed function program should be generated, and translating the fixed function state into the shader program when the packet indicates the new fixed function program should be generated.

BRIEF DESCRIPTION OF THE VARIOUS VIEWS OF THE DRAWINGS

Accompanying drawing(s) show exemplary embodiment(s) in accordance with one or more aspects of the present invention; however, the accompanying drawing(s) should not be taken to limit the present invention to the embodiment(s) shown, but are for explanation and understanding only.

FIGS. 3A and 3B are exemplary embodiments of methods of converting a combiner API call into a shader program instruction in accordance with one or more aspects of the present invention.

FIGS. 6C and 6D illustrate embodiments of other methods of converting a combiner API call into a shader program instruction with remapping in accordance with one or more aspects of the present invention.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
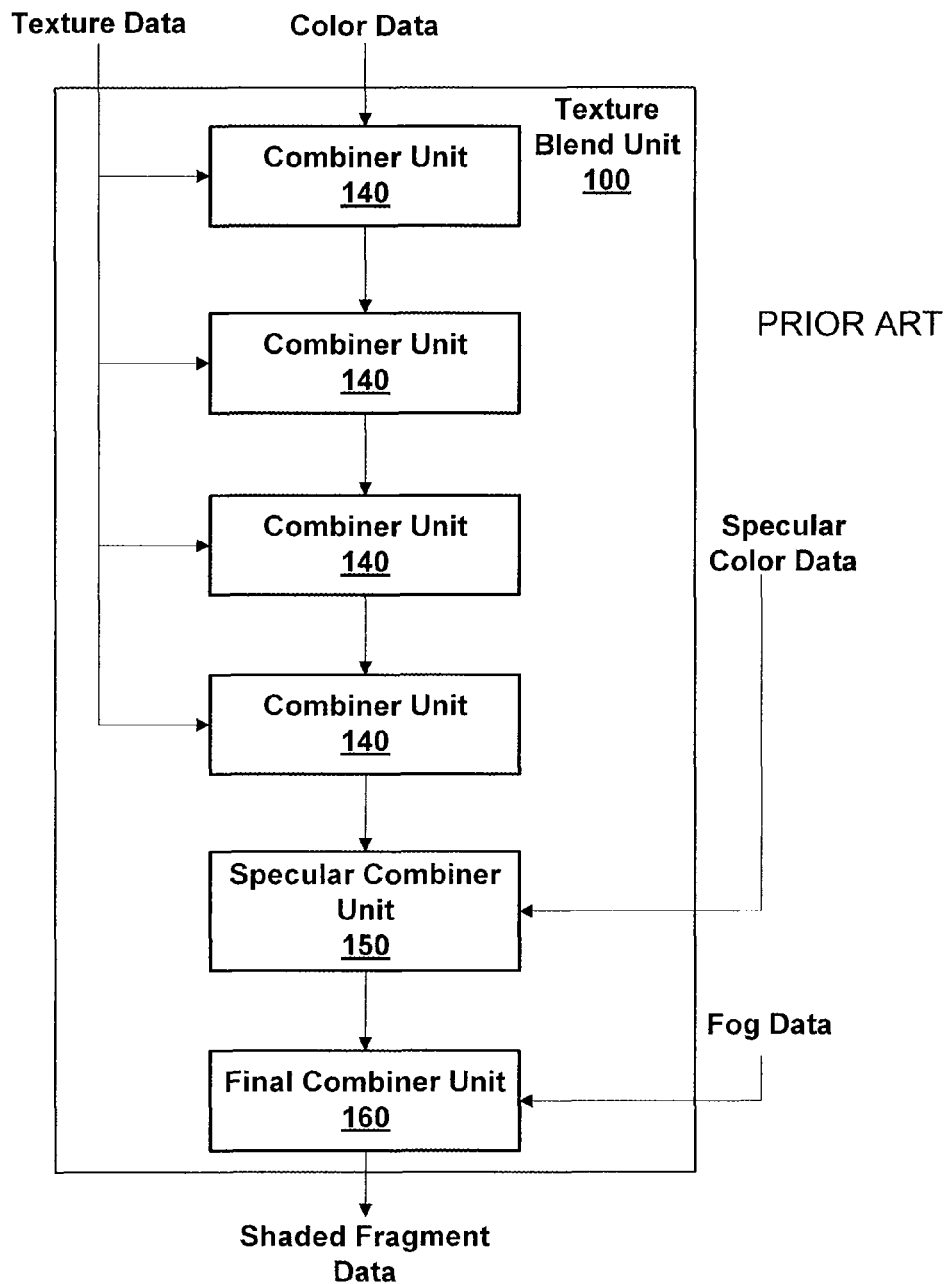
FIG. 1 is a block diagram of a prior art texture blend unit.
Figure 2A:
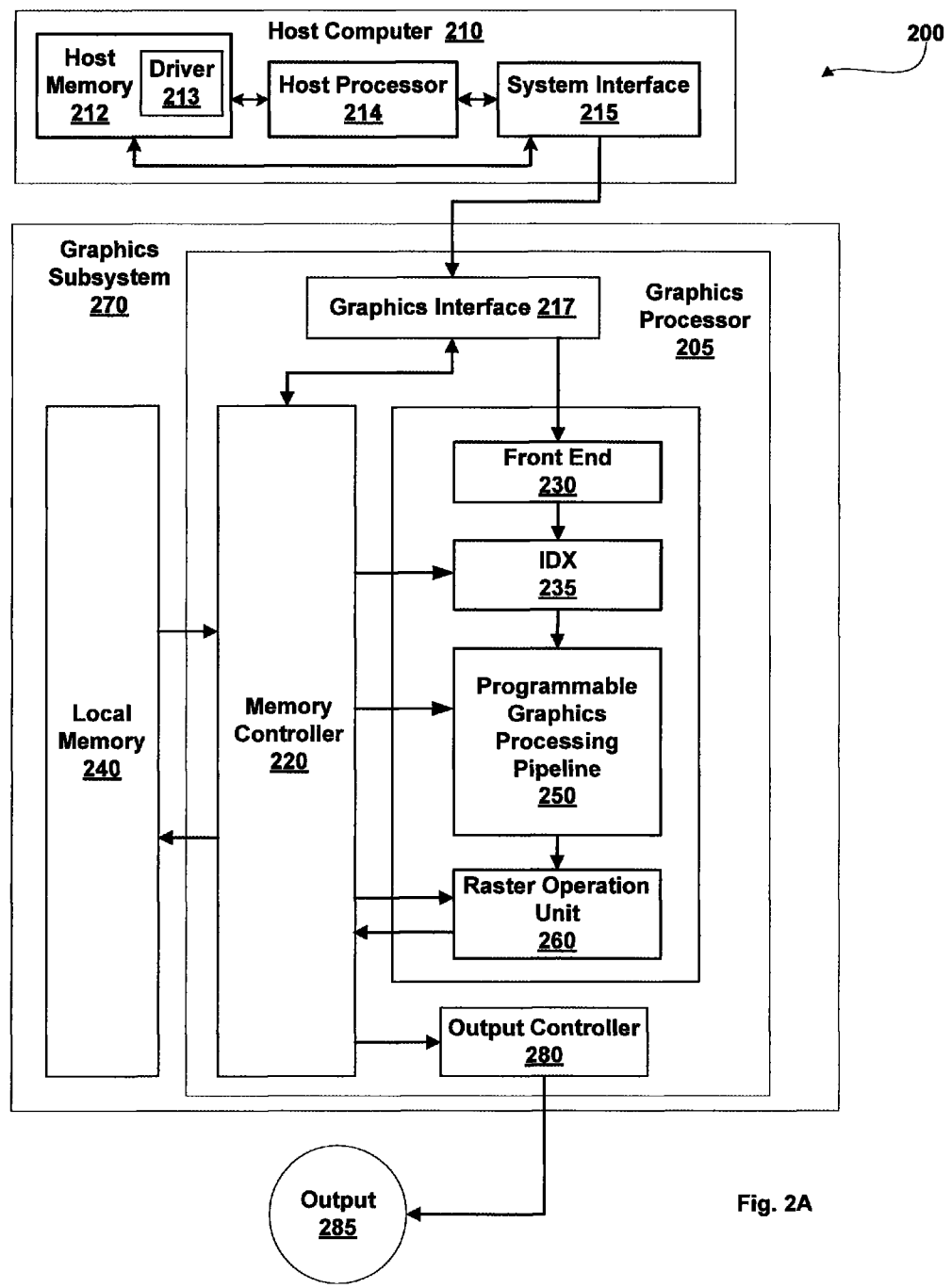
FIG. 2A is a block diagram of an exemplary embodiment of a respective computer system in accordance with one or more aspects of the present invention including a host computer and a graphics subsystem.

FIG. 2A is an illustration of a Computing System generally designated 200 and including a Host Computer 210 and a Graphics Subsystem 270. Computing System 200 may be a desktop computer, server, laptop computer, palm-sized computer, tablet computer, game console, portable wireless terminal such as a personal digital assistant (PDA) or cellular telephone, computer based simulator, or the like. Host Computer 210 includes a Host Processor 214 that may include a system memory controller to interface directly to a Host Memory 212 or may communicate with Host Memory 212 through a System Interface 215. Host Memory 212 includes a Driver 213 for translating graphics API calls into program instructions or fixed function state bundles for processing by Graphics Subsystem 270. System Interface 215 may be an I/O (input/output) interface or a bridge device including the system memory controller to interface directly to Host Memory 212. An example of System Interface 215 known in the art includes Intel® Northbridge.

Host Computer 210 communicates with Graphics Subsystem 270 via System Interface 215 and a Graphics Interface 217 within a Graphics Processor 205. Data received at Graphics Interface 217 can be passed to a Front End 230 or written to a Local Memory 240 through Memory Controller 220. Graphics Processor 205 uses graphics memory to store graphics data and program instructions, where graphics data is any data that is input to or output from components within the graphics processor. Graphics memory may include portions of Host Memory 212, Local Memory 240, register files coupled to the components within Graphics Processor 205, and the like.

Graphics Processor 205 includes, among other components, Front End 230 that receives commands from Host Computer 210 via Graphics Interface 217. Front End 230 interprets and formats the commands and outputs the formatted commands and data to an IDX (Index Processor) 235. Some of the formatted commands are used by Programmable Graphics Processing Pipeline 250 to initiate processing of data by providing the location of program instructions or graphics data stored in memory. IDX 235, Programmable Graphics Processing Pipeline 250, and a Raster Operation Unit 260 each include an interface to Memory Controller 220 through which program instructions and data can be read from memory, e.g., any combination of Local Memory 240 and Host Memory 212. When a portion of Host Memory 212 is used to store program instructions and data, the portion of Host Memory 212 can be uncached so as to increase performance of access by Graphics Processor 205.

IDX 235 optionally reads processed data, e.g., data written by Raster Operation Unit 260, from memory and outputs the data, processed data and formatted commands to Programmable Graphics Processing Pipeline 250. Programmable Graphics Processing Pipeline 250 and Raster Operation Unit 260 each contain one or more programmable processing units to perform a variety of specialized functions. Some of these functions are table lookup, scalar and vector addition, multiplication, division, coordinate-system mapping, calculation of vector normals, tessellation, calculation of derivatives, interpolation, and the like. Programmable Graphics Processing Pipeline 250 and Raster Operation Unit 260 are each optionally configured such that data processing operations are performed in multiple passes through those units or in multiple passes within Programmable Graphics Processing Pipeline 250. Raster Operation Unit 260 includes a write interface to Memory Controller 220 through which data can be written to memory.

In a typical implementation Programmable Graphics Processing Pipeline 250 performs geometry computations, rasterization, and fragment computations. Therefore, Programmable Graphics Processing Pipeline 250 is programmed to operate on surface, primitive, vertex, fragment, pixel, sample or any other data. Programmable processing units within Programmable Graphics Processing Pipeline 250 may be programmed to perform combiner operations using a shader program. Combiner operations may also be performed by the programmable processing units within Programmable Graphics Processing Pipeline 250 when Programmable Graphics Processing Pipeline 250 translates conventional combiner state bundles into a shader program, as described further herein.

Shaded fragment data output by Programmable Graphics Processing Pipeline 250 are passed to a Raster Operation Unit 260, which optionally performs near and far plane clipping and raster operations, such as stencil, z test, and the like, and saves the results or the samples output by Programmable Graphics Processing Pipeline 250 in Local Memory 240. When the data received by Graphics Subsystem 270 has been completely processed by Graphics Processor 205, an Output 285 of Graphics Subsystem 270 is provided using an Output Controller 280. Output Controller 280 is optionally configured to deliver data to a display device, network, electronic control system, other computing system such as Computing System 200, other Graphics Subsystem 270, or the like. Alternatively, data is output to a film recording device or written to a peripheral device, e.g., disk drive, tape, compact disk, or the like.

Figure 2B:
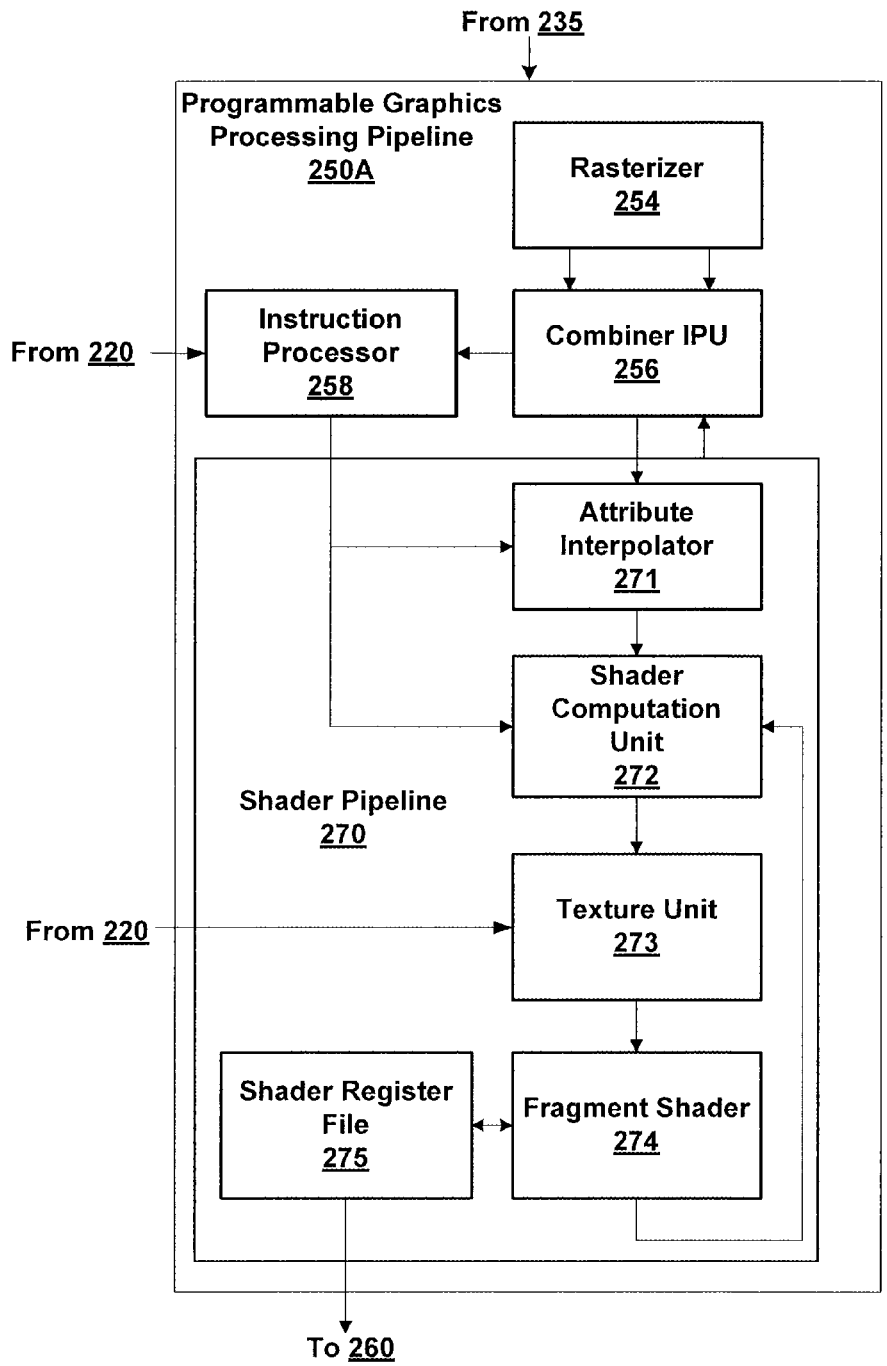
FIG. 2B is a block diagram of an exemplary embodiment of a portion of the programmable graphics processing pipeline of FIG. 2A in accordance with one or more aspects of the present invention.

FIG. 2B is a block diagram of an exemplary embodiment of a portion of Programmable Graphics Processing Pipeline 250 of FIG. 2A, shown as Programmable Graphics Processing Pipeline 250A, in accordance with one or more aspects of the present invention. Surfaces may be processed to produce primitives, the primitives may be processed to produce vertices, and the vertices may be processed by a Rasterizer 254 to produce fragments. A Combiner IPU (instruction processing unit) 256 within Programmable Graphics Processing Pipeline 250 receives a raster stream and a program stream from Rasterizer 254. The raster stream includes pixel packets of pixel data and register load packets of state bundles, including combiner state bundles. The program stream includes a program trigger that signals Combiner IPU 256 to begin generating a shader program, i.e. shader microcode, using combiner state stored within Combiner IPU 256. The combiner state is the accumulation of the combiner state bundles that are received by Combiner IPU 256. A set of combiner state represents a combiner program.

Combiner IPU 256 outputs shader programs, which emulate combiner programs, to an Instruction Processor 258. Combiner IPU 256 outputs the raster stream with inserted tokens, described further herein, to an Attribute Interpolator 271 within Shader Pipeline 270. Instruction Processor 258 receives some shader program instructions from IDX 235 and reads other program instructions from graphics memory via Memory Controller 220. In some embodiments of the present invention, Instruction Processor 258 includes an instruction cache and program instructions which are not available in the instruction cache, for example when a branch instruction is executed, are read from graphics memory. Shader programs generated by Combiner IPU 256 are output by Instruction Processor 258.

Instruction Processor 258 outputs shader program instructions to Attribute Interpolator 271. Attribute Interpolator 271 processes pixel packets received from Combiner IPU 256 in the raster stream as specified by the shader program instructions and any state bundles that are not translated into shader program instructions. For example, Attribute Interpolator 271 may produce interpolated attributes, including texture coordinates, barycentric coefficients, and depth and perform clipping. The barycentric coefficients may be used for computing interpolated primary and secondary colors, and interpolated fog distance. Attribute Interpolator 271 outputs the interpolated attributes to a Shader Computation Unit 272.

Shader Computation Unit 272 also receives shader program instructions and state bundles that are not translated into shader program instructions from Instruction Processor 258. Shader Computation Unit 272 performs perspective correction of the interpolated attributes (input operands). Shader Computation Unit 272 may also receive input operands from a Shader Register File 275 via a Fragment Shader 274. Shader Computation Unit 272 may be programmed to clamp input operands and scale perspective corrected attributes. Shader Computation Unit 272 outputs the perspective corrected attributes to a Texture Unit 273. Shader Computation Unit 272 also outputs input operands that are received from Shader Register File 275 for Texture Unit 273.

Texture Unit 273 receives the perspective corrected attributes and any input operands and performs texture lookups to read texels stored in graphics memory. Texture Unit 273 remaps texels to a format that may be stored in Shader Register File 275, for example, a 16-bit or 32-bit floating point value. Texture Unit 273 may be programmed to clamp the texels. Texture Unit 273 may also pass perspective corrected attributes through from Shader Computation Unit 272 to Fragment Shader 274.

Fragment Shader 274 may be configured by shader program instructions to perform combiner operations, receiving color data and texels and producing shaded fragment data. Fragment Shader 274 includes multiply-accumulate units and a computation unit capable of executing scalar instructions such as $\log_2$, sine, cosine, and the like. Fragment Shader 274 may read source data stored in Shader Register File 275. The shaded fragment data and/or the source data may be output by Fragment Shader 274 to Shader Computation Unit 272. Fragment Shader 274 may also write destination data, e.g., shaded fragment data, into output registers within Shader Register File 275 which are output to Raster Operation Unit 260.

A conventional graphics processor including fixed function combiner unit is configured using fixed function state bundles, specifically combiner state bundles, produced by a conventional driver. In contrast, Fragment Shader 274 is programmed to perform combiner functions using shader program instructions. However, Fragment Processor 255, may receive combiner state bundles produced by the conventional driver for the conventional graphics processor, and translate a combiner program represented by the combiner state bundles into a shader program. Alternatively, when a new driver, i.e., a driver supporting Fragment Shader 274 shader programs for performing combiner operations, is used, the new driver may produce the shader program to emulate the combiner program in which case Combiner IPU 256 is idle.

Figure 2C:
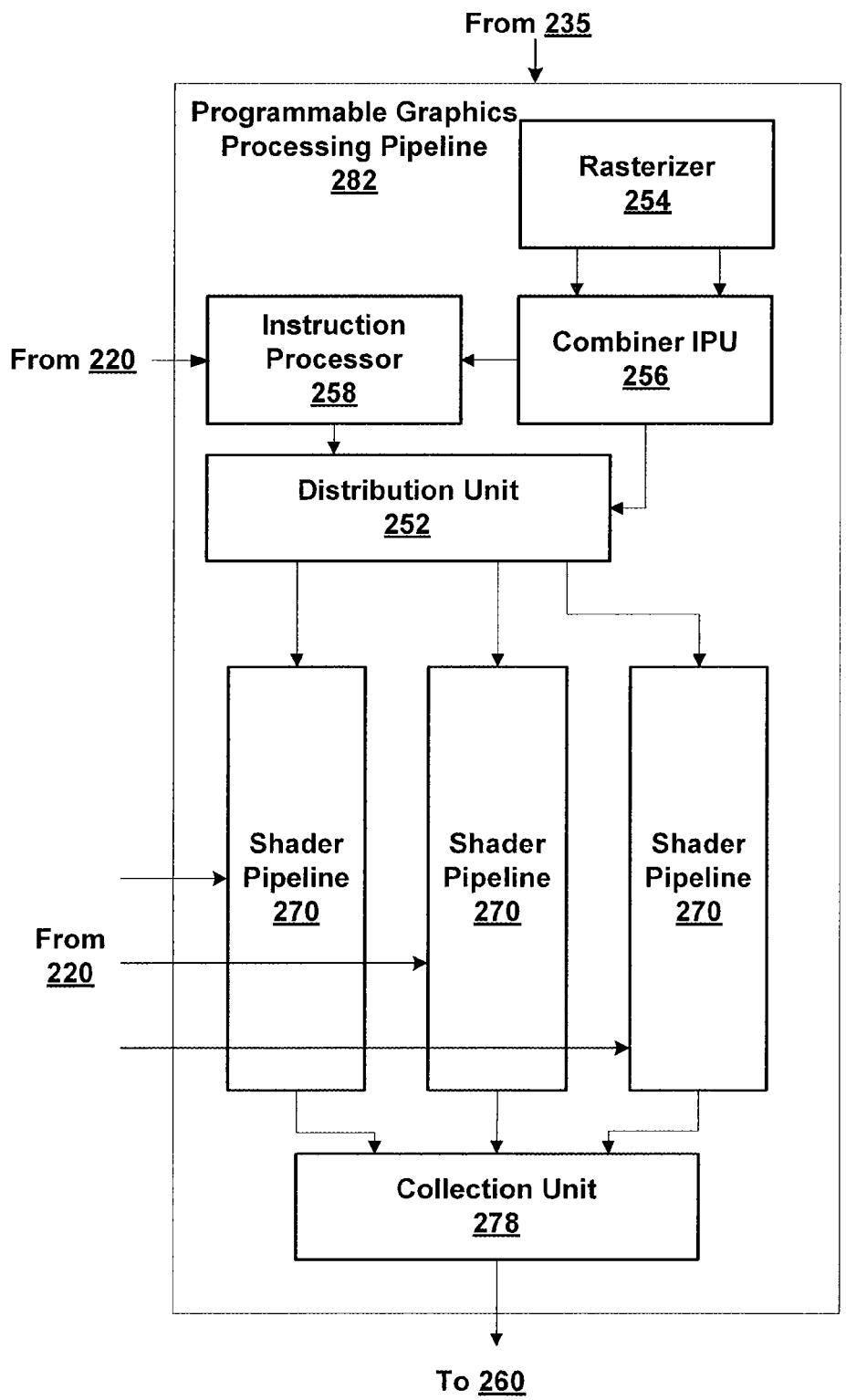
FIG. 2C is a block diagram of another exemplary embodiment of a portion of the programmable graphics processing pipeline of FIG. 2A in accordance with one or more aspects of the present invention.

FIG. 2C is a block diagram of another exemplary embodiment of a portion of Programmable Graphics Processing Pipeline 250 of FIG. 2A, shown as Programmable Graphics Processing Pipeline 282, in accordance with one or more aspects of the present invention. Programmable Graphics Processing Pipeline 282 includes three Shader Pipelines 270. In alternate embodiments of Programmable Graphics Processing Pipeline 282, fewer or more Shader Pipelines 270 are included. A Shader Distribution Unit 252 receives the raster stream and shader program instructions from Instruction Processor 258 and a combiner program stream from Combiner IPU 256 and distributes the shader program instructions, including shader program instructions from the combiner program stream to one or more Shader Pipelines 270. Shader Distribution Unit 252 distributes each pixel packet from the raster stream to one Shader Pipeline 270 for processing. A Collection Unit 278 gathers the shaded fragment data from each Shader Pipeline 270 and outputs the shaded fragment data to Raster Operation Unit 260.

FIG. 3A is an exemplary embodiment of a method of converting a combiner API call into a shader instruction in accordance with one or more aspects of the present invention. In step 305 a conventional driver receives a combiner API call. In step 310 the conventional driver converts the combiner API call into a combiner state bundle, presumably for execution by a conventional graphics processor. Alternatively, the conventional driver converts two or more combiner API calls into at least one combiner state bundle. In step 315 Graphics Processor 205 receives the combiner state bundle from the conventional driver and Combiner IPU 256 converts the combiner state bundle into a shader program instruction. Therefore, the conventional driver operates properly with Graphics Processor 205 even though Graphics Processor 205 does not include a fixed function combiner unit. Alternatively, Combiner IPU 256 converts a plurality of combiner state bundles into a shader program including at least one shader program instruction.

FIG. 3B is another exemplary embodiment of a method of converting a combiner API call into a shader instruction in accordance with one or more aspects of the present invention. In step 306 another driver receives a combiner API call. In step 320 the other driver converts the combiner API call into a shader program instruction for execution by Graphics Processor 205. Alternatively, the other driver converts a plurality of combiner API calls into a shader program including at least one shader program instruction. In some embodiments of the present invention, a portion of the API call conversion is offloaded from the other driver to Combiner IPU 256 to improve performance of the other driver. For example, like the conventional driver, the other driver may convert combiner API calls into fixed function state bundles, such as combiner state bundles, and the translation of the fixed function state bundles into a shader program may be offloaded from the other driver to a fixed function instruction processing unit, such as Combiner IPU 256. Likewise, a portion of the conversion of other fixed function API calls, i.e., for LOD computation, texture filtering, or the like, may also be offloaded, i.e., translated by one or more fixed function instruction processing units within Graphics Processor 205.

Figure 4A:
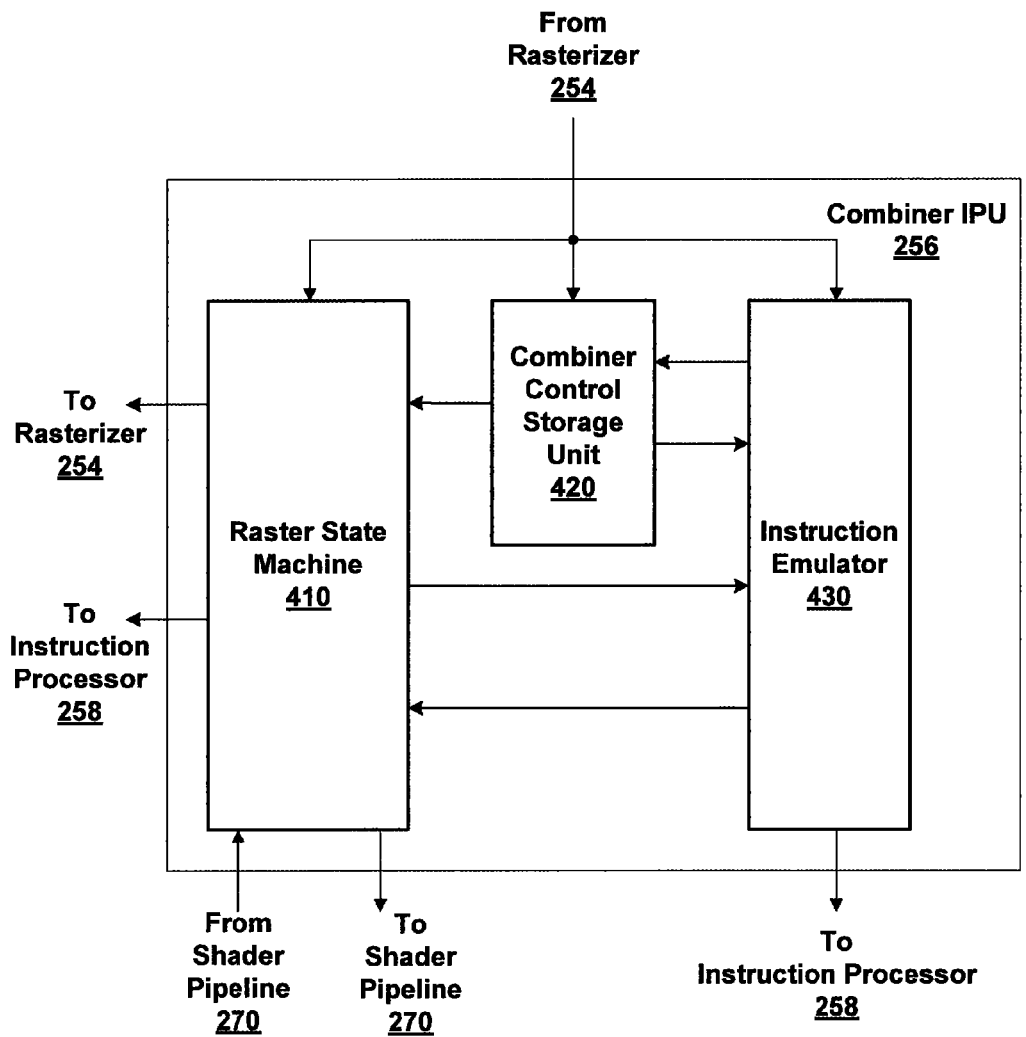
FIG. 4A is a block diagram of an exemplary embodiment of the combiner IPU of FIG. 2B in accordance with one or more aspects of the present invention.

FIG. 4A is a block diagram of an exemplary embodiment of Combiner IPU 256 of FIG. 2B in accordance with one or more aspects of the present invention. A storage unit, Combiner Control Storage Unit 420, and a state machine, Raster State Machine 410, receive a raster stream including packets of pixel data and register load packets of (fixed function) state bundles. Combiner Control Storage Unit 420 includes registers for storing the fixed function state, e.g., combiner state, included in the state bundles. The combiner state specifies the operations a fixed function combiner would be configured to perform. Source operands processed by the combiner state may be stored in Shader Register File 275 or included in pixel packets. Combiner Control Storage Unit 420 detects when a state change occurs, i.e., a state bundle changed the value of a register in Combiner Control Storage Unit 420, and outputs a "dirty" signal to Raster State Machine 410. Raster State Machine 410 receives the raster stream and inserts block tokens and allocation bundles into the raster stream, as described in conjunction with FIG. 5A, prior to outputting the raster stream to Instruction Processor 258.

Raster State Machine 410 determines when a new shader program should be generated to emulate the functions specified by a fixed function (combiner) program based on the "dirty" signal received from Combiner Control Storage Unit 420. Raster State Machine 410 inserts block tokens in the output raster stream when a new program should be generated to drain Shader Pipeline 270. Raster State Machine 410 receives an idle signal from Shader Pipeline 270 indicating that the Shader Pipeline 270 is idle and may receive a new shader program generated by an Instruction Emulator 430. In some embodiments of the present invention, Combiner Control Storage Unit 420 includes registers to store one set of combiner program state and Raster State Machine 410 outputs a stall signal to Rasterizer 254 to block the raster stream as needed to translate the program state into a shader program. In other embodiments of the present invention, Combiner Control Storage Unit 420 includes registers to store two or more sets of combiner program state and Raster State Machine 410 only outputs the stall signal to Rasterizer 254 when the two or more sets of combiner program state are in use.

Figure 5A:
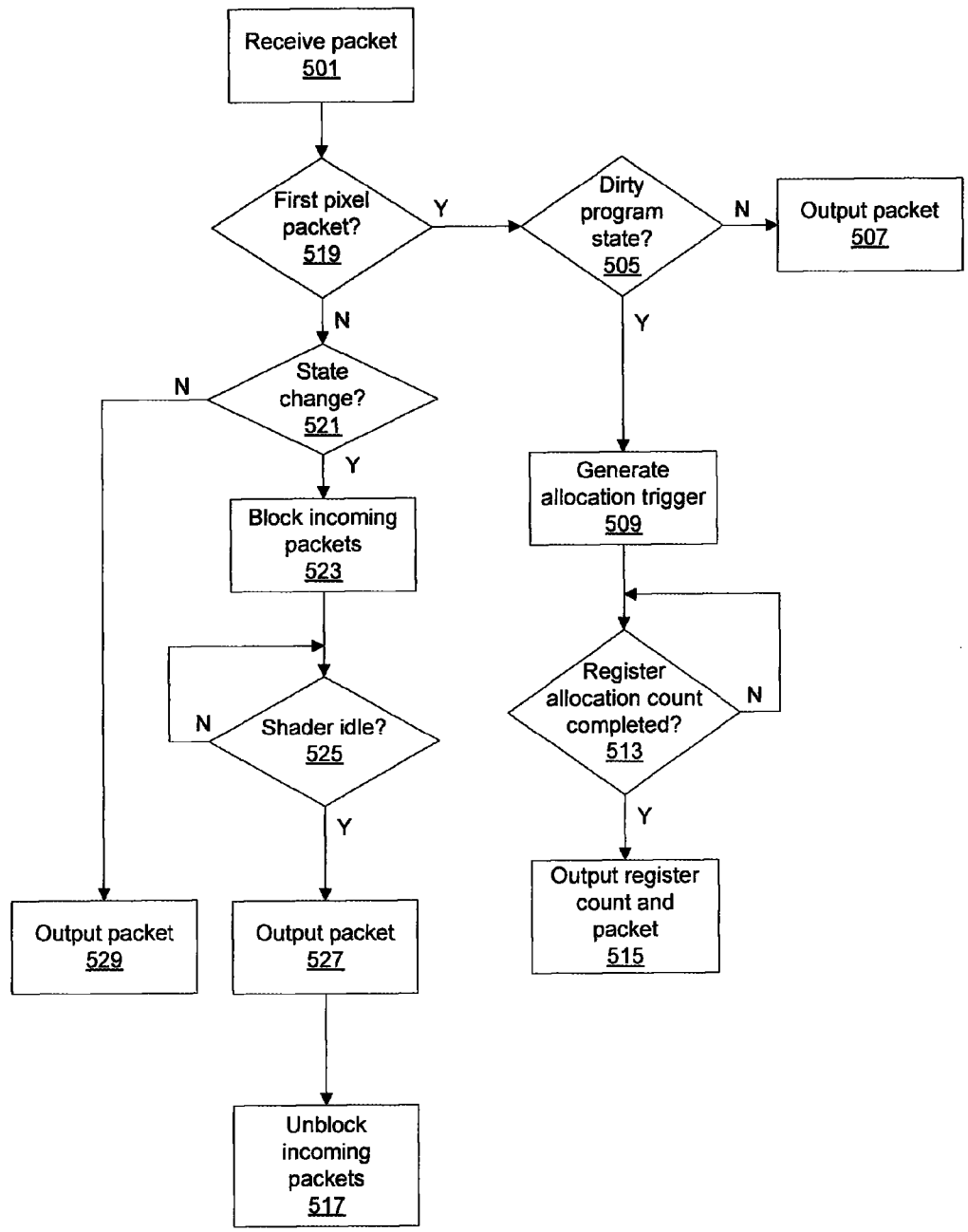
FIG. 5A illustrates an embodiment of a method of determining when to generate a program in accordance with one or more aspects of the present invention.
Figure 5B:
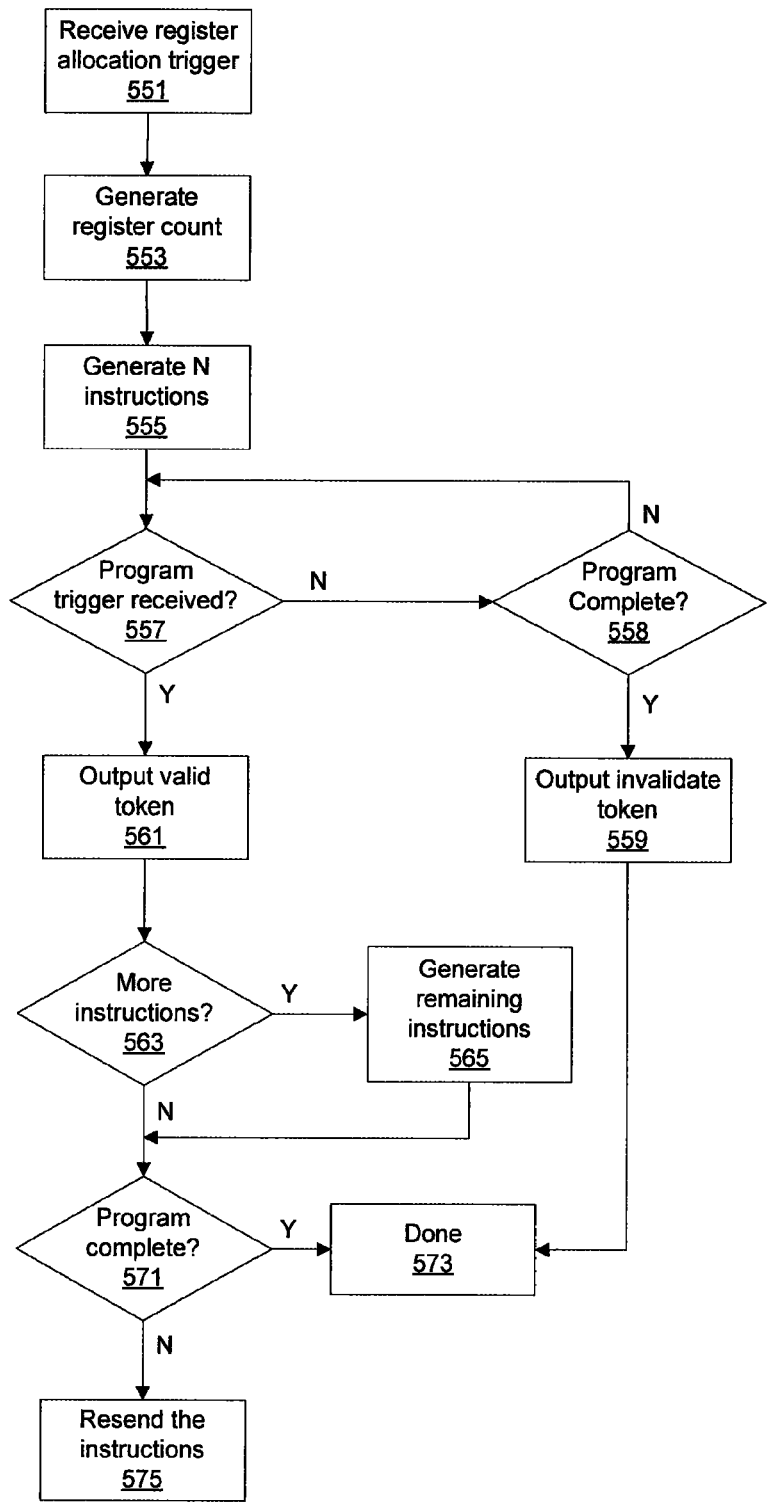
FIG. 5B illustrates an embodiment of a method of generating a program in accordance with one or more aspects of the present invention.

Instruction Emulator 430 receives a program stream including a program trigger and determines when to start and stop outputting shader program instructions to Instruction Processor 258, as described in conjunction with FIG. 5B. Instruction Emulator 430 also reads the state bundle data from Combiner Control Storage Unit 420 and generates shader program instructions to emulate the fixed function program specified by the state bundles. When a new shader program should be generated, Raster State Machine 410 outputs register allocation trigger to Instruction Emulator 430. Before generating and outputting the shader program instructions, Instruction Emulator 430 determines the number of registers in Shader Register File 275 needed to execute the shader program and returns a register allocation count to Raster State Machine 410. In some embodiments of the present invention, Instruction Emulator 430 remaps the registers allocated for processing of the shader program, as described in conjunction with FIG. 6A. Raster State Machine 410 outputs register allocation bundles to Instruction Processor 258 including the number of registers.

Figure 4B:
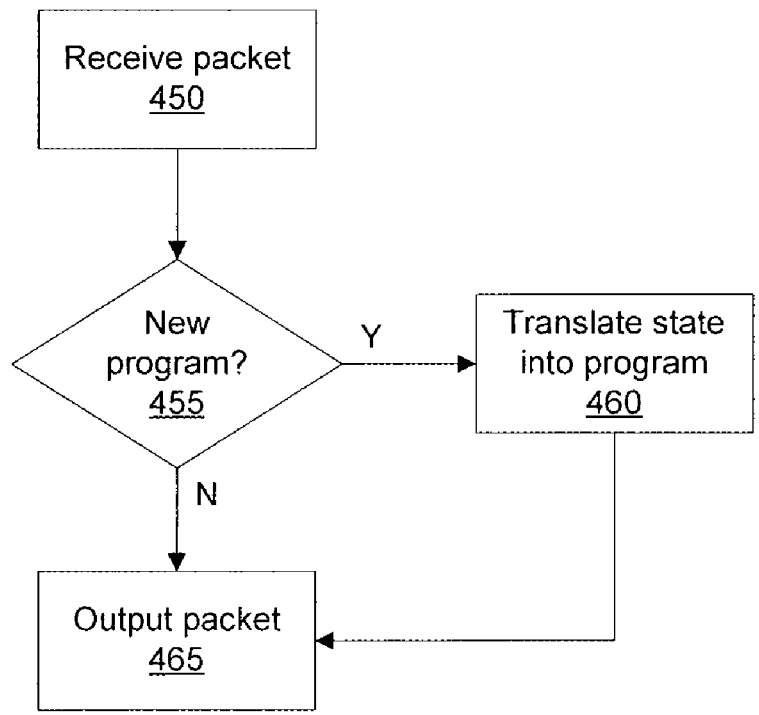
FIG. 4B is an exemplary embodiment of a method of converting fixed function state into a shader program in accordance with one or more aspects of the present invention.

FIG. 4B is an exemplary embodiment of a method of converting fixed function state received via state bundles into a shader program in accordance with one or more aspects of the present invention. In step 450 Combiner IPU 256 receives a packet from the raster stream. In step 455 Raster State Machine 410 determines if a new shader program should be generated using the program state stored in Combiner Control Storage Unit 420. A new shader program should be generated when the first pixel packet is received following one or more register load packets which changed the program state.

If, in step 455 Raster State Machine 410 determines that a new program should be generated, then in step 460 Raster State Machine 410 signals Instruction Emulator 430 to begin translating the program state into a shader program and proceeds to step 465. If, in step 455 Raster State Machine 410 determines that a new program should not be generated, then Raster State Machine 410 also proceeds to step 465. In step 465 Raster State Machine 410 outputs the packet to Shader Pipeline 270.

FIG. 5A illustrates an embodiment of a method of determining when to generate a program in accordance with one or more aspects of the present invention. Receipt of the first pixel packet following any state bundle triggers a recount of the registers required by the combiner program when the program state is "dirty." When the program state is not "dirty," the pixel packets flow through Raster State Machine 410. Register load packets also pass through Raster State Machine 410, however a register load packet which causes a fixed function state register to change value causes Raster State Machine 410 to block the incoming raster stream and insert a blocking token in the outgoing raster stream. Raster State Machine 410 then waits until Shader Pipeline 270 completes processing any pixel packets that were output before the register load packet caused the fixed function state register to change and then unblocks the incoming raster stream.

In step 501 Raster State Machine 410 receives a packet. In step 519 Raster State Machine 410 determines if the packet is the first pixel packet received following one or more register load packets, and, if so, in step 519 Raster State Machine 410 determines the packet is the first pixel packet received following one or more register load packets, then, in step 505 Raster State Machine 410 determines if the program state is "dirty." The program state is "dirty" when either a reset has occurred or a fixed function state register has changed value via a register load packet. Raster State Machine 410 receives a "dirty" signal from Combiner Control Storage Unit 420 indicating whether or not the program state is "dirty."

If, in step 505 Raster State Machine 410 determines the register allocation count is not "dirty" Raster State Machine 410 proceeds to step 507 and outputs the packet to Shader Pipeline 270. Otherwise, in step 509 Raster State Machine 410 generates an allocation trigger that is output to Instruction Emulator 430 which then initiates a register allocation count. In step 513 Raster State Machine 410 determines if the register allocation count is completed, i.e., if a register count completed signal and the register count have been received by Raster State Machine 410 from Instruction Emulator 430. Raster State Machine 410 remains in step 513 until Raster State Machine 410 determines that the register allocation count has been completed and then Raster State Machine 410 proceeds to step 515.

In step 515 Raster State Machine 410 inserts an allocation bundle including the register count into the output raster stream by outputting a packet including the allocation bundle to Shader Pipeline 270. In step 515 Raster State Machine 410 also outputs the pixel packet received in step 501.

If, in step 519 Raster State Machine 410 determines that the packet is not the first pixel packet received following one or more register load packets, then in step 521 Raster State Machine 410 determines if there has been a change in the program state as indicated by the "dirty" signal output by Combiner Control Storage Unit 420. If, in step 521 Combiner Control Storage Unit 420 determines that the incoming packet is a register load packet that does not result in a change of the program state, then Raster State Machine 410 proceeds to step 529 and outputs the packet to Shader Pipeline 270. If, in step 521 Combiner Control Storage Unit 420 determines that the incoming packet is a register load packet that does result in a program state change, then in step 523 Raster State Machine 410 blocks incoming packets in order for Shader Pipeline 270 to complete execution of the shader program. Raster State Machine 410 outputs a block token to drain the shader pipeline.

In an alternate embodiment of the present invention, Combiner Control Storage Unit 420 includes additional registers to store two or more sets of program state and Raster State Machine 410 blocks incoming register load packets when all of the sets of program state are in use. In step 525 Raster State Machine 410 determines if Shader Pipeline 270 has completed execution of the shader program based on the idle signal received from Shader Pipeline 270. When Raster State Machine 410 determines that Shader Pipeline 270 is idle, Raster State Machine 410 proceeds to step 527 and outputs the packet received in step 510 to Shader Pipeline 270. In step 517 Raster State Machine 410 unblocks incoming packets.

FIG. 5B illustrates an embodiment of a method of generating a program in accordance with one or more aspects of the present invention. Instruction Emulator 430 generates a shader program to emulate a fixed function program, such as a combiner program, and determines when to start and stop outputting the shader program instructions that make up the shader program.

In step 551 Instruction Emulator 430 receives a register allocation trigger from Raster State Machine 410. In step 553 Instruction Emulator 430 generates register allocation count and optionally creates a mapping table of the allocated registers, as described in conjunction with FIG. 6B. Raster State Machine 410 triggers Instruction Emulator 430 to generate one register allocation count for each fixed function program. In step 553 Instruction Emulator 430 also outputs the register allocation count to Raster State Machine 410. In step 555 Instruction Emulator 430 reads the program state and generates up to N shader program instructions to emulate at least a portion of the fixed function program, where N is a positive integer. In some embodiments of the present invention, N is as many as 8 shader program instructions.

In step 555 Instruction Emulator 430 also outputs the N shader program instructions to Instruction Processor 258. In step 557 Instruction Emulator 430 determines if the program trigger has been received from the program stream, and, if not, in step 558 Instruction Emulator 430 determines if execution of the shader program is complete, as indicated by Raster State Machine 410. If, in step 558 Instruction Emulator 430 determines that execution of the shader program is not complete, then Instruction Emulator 430 returns to step 557. If, in step 558 Instruction Emulator 430 determines that execution of the shader program is complete, then in step 559 Instruction Emulator 430 outputs an invalidate token to Instruction Processor 258 to indicate that the previously output N shader program instructions are invalid and should be discarded and proceeds to step 573. In step 557 when the program trigger is received, the method proceeds to step 561, where Instruction Emulator 430 outputs a valid token to Instruction Processor 258 to indicate that the previously output N shader program instructions are valid.

In step 563 Instruction Emulator 430 determines if additional shader program instructions need to be generated to emulate the fixed function program, and, if so, in step 565 Instruction Emulator 430 generates the additional shader program instructions and outputs them to Instruction Processor 258. In step 571 Instruction Emulator 430 determines if execution of the shader program is complete, as indicated by Raster State Machine 410, and, if so, Instruction Emulator 430 proceeds to step 573 and emulation of the fixed function program is complete. If, in step 571 Instruction Emulator 430 determines execution of the shader program is not complete, then in step 575 Instruction Emulator 430 resends the shader program instructions to Instruction Processor 258. In an alternate embodiment of the present invention, the shader program instructions are stored within Instruction Processor 258 and Instruction Emulator 430 does not resend the shader program instructions. In some embodiments of the present invention in Instruction Emulator 430 also generates the shader program instructions by returning to step 555 instead of proceeding to step 575. If, in step 563 Instruction Emulator 430 determines additional shader program instructions do not need to be generated to emulate the fixed function program, Instruction Emulator 430 proceeds to step 571 and either step 573 or step 575 as previously described.

Figure 6A:
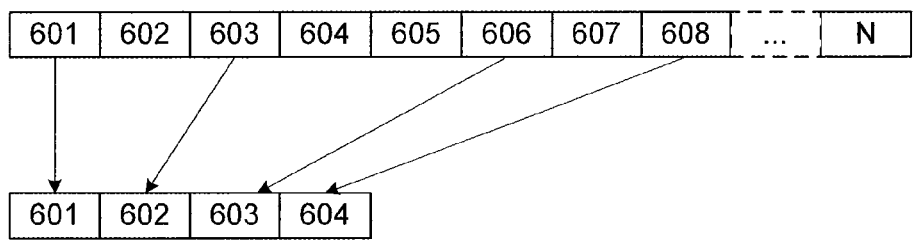
FIG. 6A illustrates a diagram illustrating remapping of registers in accordance with one or more aspects of the present invention.

FIG. 6A illustrates a diagram illustrating remapping of state registers in accordance with one or more aspects of the present invention. During register allocation Instruction Emulator 430 may determine that the registers specified by a fixed function program are sparsely packed. For example Register 601, 603, 606 and 608 may be used by the fixed function program. Therefore Instruction Emulator 430 may generate a remapping table to more efficiently pack the registers allocated in Shader Register File 275 for processing the shader program which emulates the fixed function program. As shown in FIG. 6A, the remapping table may map Register 601 to Register 601, Register 603 to Register 602, Register 606 to Register 603, and Register 608 to Register 604. Remapping to pack the registers may leave registers available for allocation to another program, thereby improving processing efficiency and performance of Shader Pipeline 270.

Figure 6B:
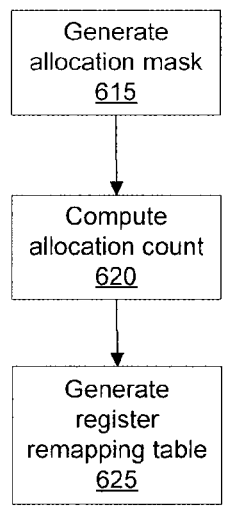
FIG. 6B illustrates an embodiment of a method of remapping registers in accordance with one or more aspects of the present invention.

FIG. 6B illustrates an embodiment of a method of remapping registers in accordance with one or more aspects of the present invention. In step 615 Instruction Emulator 430 sequentially examines all of the program state stored in Combiner Control Storage Unit 420 and creates a mask indicating the registers required in Shader Register File 275 for execution of the shader program which emulates the fixed function program. In step 620 Instruction Emulator 430 uses the mask to compute a count of the registers. In step 625 Instruction Emulator 430 remaps the allocated registers, as described in conjunction with FIG. 6A, and generates a mapping table of the remapped allocated registers. In some embodiments of the present invention, step 630 is omitted and the allocated registers are not remapped.

FIG. 6C illustrates an embodiment of another method of converting a combiner API call into a shader program instruction with remapping in accordance with one or more aspects of the present invention. In step 650 a driver receives a combiner API call. In step 655 the driver converts the fixed function API call into a fixed function state bundle for execution by Graphics Processor 205.

In some embodiments of the present invention, a portion of the API call conversion is offloaded from the driver to Combiner IPU 256 to improve performance of the driver. For example, the driver may convert fixed function API calls into fixed function state bundles and offload the translation of the fixed function state bundles into a shader program to Combiner IPU 256. Likewise, a portion of the conversion of other API calls may also be offloaded, i.e., translated by one or more fixed function instruction processing units within Graphics Processor 205.

In step 665 Instruction Emulator 430 within Combiner IPU 256 remaps the registers specified by the fixed function state bundles generated in step 655. Even if the driver converts the fixed function API call directly into a shader program instruction, Combiner IPU 256 may perform register remapping to improve the efficiency of the registers used in Shader Register File 275, possibly improving processing performance of Shader Pipeline 270.

FIG. 6D illustrates an embodiment of another method of converting a combiner API call into a shader program instruction with remapping in accordance with one or more aspects of the present invention. In step 650 a driver receives a combiner API call. In step 660 the driver converts the fixed function API call into a shader program instruction for execution by Graphics Processor 205. Alternatively, the driver converts a plurality of combiner API calls into a shader program including at least one shader program instruction. In step 665 Instruction Emulator 430 within Combiner IPU 256 remaps the registers specified by the shader program instruction or shader program generated in step 660.

Therefore, persons skilled in the art will appreciate that any system configured to perform the method steps of FIGS. 6A, 6B, 6C, or their equivalents, is within the scope of the present invention. Furthermore, persons skilled in the art will appreciate that the method steps of FIGS. 6A, 6B, 6C, may be extended to support translation of other types of API calls, such as API calls used to configure conventional fixed function computation units.

The invention has been described above with reference to specific embodiments. It will, however, be evident that various modifications and changes may be made thereto without departing from the broader spirit and scope of the invention as set forth in the appended claims. The foregoing description and drawings are, accordingly, to be regarded in an illustrative rather than a restrictive sense. The listing of steps in method claims do not imply performing the steps in any particular order, unless explicitly stated in the claim.

All trademarks are the respective property of their owners.

The invention claimed is:

1. A method of generating shader program instructions to control a fragment shader within a programmable graphics processing pipeline, wherein the programmable graphics processing pipeline includes a GPU driver and a combiner instruction processing unit (IPU), the method comprising:
    receiving, at the GPU driver, a fixed function application programming interface (API) call to perform one or more combiner operations on pixel data;
    converting, at the GPU driver, the fixed function API call into a fixed function state that represents the one or more combiner operations;
    providing the fixed function state to the combiner instruction processing unit;
    translating, at the combiner instruction processing unit, the fixed function state into at least one shader program instruction for performing the one or more combiner operations, wherein the at least one shader program instruction is suitable for execution by the fragment shader within the programmable graphics processing pipeline for shading one or more pixels for display; and
    after translating the fixed function state into the at least one shader program instruction, providing the at least one shader program instruction to the fragment shader within the programmable graphics processing pipeline for execution.

2. The method of claim 1, further comprising the steps of:
    determining a number of registers needed to execute the fixed function API call based on the fixed function state; and
    allocating the number of registers prior to the translating of the fixed function state.

3. The method of claim 2, further comprising the step of remapping the number of registers to pack the registers and produce a register remap table.

4. The method of claim 1, further comprising the step of allocating registers for processing the at least one shader program instruction.

5. The method of claim 4, further comprising the step of remapping the registers to produce a register remap table.

6. The method of claim 5, wherein the remapping is performed within the programmable graphics processing pipeline.

7. The method of claim 1, further comprising the step of determining that a pixel packet for processing by the fragment shader within the programmable graphics processing pipeline is a first pixel packet received after a fixed function state change.

8. The method of claim 7, further comprising the step of blocking incoming pixel packets until the fragment shader within the programmable graphics processing pipeline becomes idle.

9. The method of claim 8, further comprising the steps of:
    determining that the fragment shader within the programmable graphics processing pipeline is idle; and
    accepting incoming pixel packets to process the incoming pixel packets using the fixed function state change.

10. The method of claim 1, wherein the fixed function API call is a combiner API call and the fixed function state is a combiner state bundle.

11. A method as in claim 1, further comprising executing the at least one shader program instruction for performing the fixed function API call using the fragment shader within the programmable graphics processing pipeline.

12. An apparatus for generating shader program instructions for performing an application programming interface (API) call to perform combiner operations, comprising:
    a GPU driver stored in a memory configured to:
        receive and store a set of fixed function states associated with an API call to perform one or more combiner operations on pixel data, wherein the set of fixed function state represents the one or more combiner operations, and
        provide the fixed function states to the combiner instruction processing unit; and
    a combiner instruction processing unit configured to:
        generate the shader program instructions for performing the one or more combiner operations by translating the fixed function state into at least one shader program instruction, wherein the at least one shader program instruction is suitable for execution by a fragment shader within the programmable graphics processing pipeline for performing the combiner functions and produce one or more pixels for display, and
        after translating the fixed function state into the at least one shader program instruction, provide the at least one shader program instruction to the fragment shader within the programmable graphics processing pipeline for execution.

13. The apparatus of claim 12, wherein the GPU driver is further configured to convert a fixed function API call into one or more fixed function state bundles that represent the fixed function state.

14. The apparatus of claim 12, further comprising a raster state machine coupled to the combiner instruction processing unit and configured to receive pixel packets and determine whether or not the pixel packets indicate a new fixed function program should be generated by detecting that a pixel packet is a first pixel packet received after a fixed function state change.

15. The apparatus of claim 14, wherein the raster state machine is further configured to block incoming pixel packets until the fragment shader within the programmable graphics processing pipeline becomes idle.

16. The apparatus of claim 15, wherein the raster state machine is further configured to accept incoming pixel packets to process the incoming pixel packets using the fixed function state change when the fragment shader within the programmable graphics processing pipeline becomes idle.

17. The apparatus of claim 12, wherein the combiner instruction processing unit is configured to determine and allocate a number of registers needed to execute the fixed function API call based on the fixed function state.

18. The apparatus of claim 17, wherein the combiner instruction processing unit is configured to remap the registers to pack the registers and produce a register remap table.

19. The apparatus of claim 12, wherein the fixed function API call is a combiner API call and the fixed function state bundle is a combiner state bundle.

* * * * *